W. Clayton,
Attaching Knives to Handles.
N° 57,677.    Patented Sep. 4, 1866.
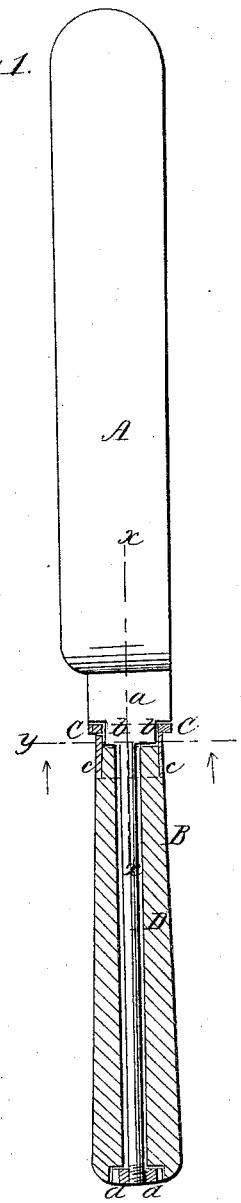
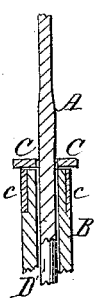
Witnesses:     Inventor:

UNITED STATES PATENT OFFICE.

WILLIAM CLAYTON, OF BRISTOL, CONNECTICUT.

IMPROVEMENT IN ATTACHING KNIVES TO THEIR HANDLES.

Specification forming part of Letters Patent No. 57,677, dated September 4, 1866.

*To all whom it may concern:*

Be it known that I, WILLIAM CLAYTON, of Bristol, in the county of Hartford and State of Connecticut, have invented a new and useful Improvement in Attaching Knives to their Handles; and I do hereby declare that the following is a full, clear, and exact description thereof, which will enable others skilled in the art to make and use the same, reference being had to the accompanying drawings, forming a part of this specification.

This invention consists of a recessed bolster of a blade and a tang, the end of which has a screw-thread cut thereon, in combination with a handle, nut, ferrule, and guard so arranged as to make a firm article, as hereinafter more fully described.

In the accompanying drawings, Figure 1 is a side elevation of a knife with the handle in section to expose the tang and show the manner of fastening the same. Fig. 2 is a longitudinal section, taken on the plane of the line $x\,x$, Fig. 1. Fig. 3 is a cross-section, taken on the plane of the line $y\,y$, Fig. 1. Fig. 4 is a view of the rear end of the handle. Fig. 5, in red, is a back view of a cheaper style of knife with its handle attached.

Similar letters of reference indicate like parts.

A designates the blade of the knife, which has its bolster $a$ recessed or cut out at its lower end, as shown at $b$, Fig. 1, and this is let into a suitable cavity in the handle B of the knife, the rear end of the handle being strengthened by a ferrule, $c$, in the usual manner. C is a guard which encircles the part $b$ of the bolster, and which is retained rigidly in place when the knife is secured to its handle.

D is the tang of the blade. This tang passes through a suitable hole made in the handle to the rear end thereof, and it has a screw-thread cut upon its end, upon which screws a nut, $d$, which is countersunk into the end of the handle, so that its outer face, when it is screwed down, is flush with the end of the handle and also the end of the tang.

What I claim as new, and desire to secure by Letters Patent, is—

The recessed bolster $a$ of the blade A, in combination with the tang D and nut $d$, arranged with the ferrule $c$, guard C, and handle B, in the manner and for the purpose herein specified.

WILLIAM CLAYTON.

Witnesses:
GEORGE TURNER,
SAMUEL P. NEWELL.